United States Patent [19]

Tixador et al.

[11] Patent Number: 4,855,859
[45] Date of Patent: Aug. 8, 1989

[54] DETECTION DEVICE FOR DETECTING TRANSITIONS TO THE NORMAL STATE IN A SUPERCONDUCTING WINDING, IN PARTICULAR FOR GENERATING ELECTRICITY, AND A PROTECTION DEVICE FOR PROTECTING SUCH A WINDING

[75] Inventors: Pascal Tixador, Grenoble; Yves Brunet, Gieres, both of France

[73] Assignee: Societe Anonyme dite Alsthom, Paris Cedex, France

[21] Appl. No.: 175,441

[22] Filed: Mar. 30, 1988

[30] Foreign Application Priority Data

Mar. 30, 1987 [FR] France ................. 87 04404

[51] Int. Cl.[4] .......................................... H02H 7/08
[52] U.S. Cl. ..................................... 361/19; 361/85; 361/91; 505/876
[58] Field of Search ..................... 361/19, 20, 30, 31, 361/33, 54, 56, 57, 85, 86, 87, 91, 93, 103, 79; 335/216; 505/876

[56] References Cited

U.S. PATENT DOCUMENTS

| | | | |
|---|---|---|---|
| 4,021,703 | 5/1977 | Gary et al. ......................... | 361/85 |
| 4,271,443 | 6/1981 | Nöther ............................... | 361/19 |
| 4,375,659 | 3/1983 | Cunningham et al. ............. | 361/19 |
| 4,393,429 | 7/1983 | Maki et al. .......................... | 361/19 |
| 4,451,823 | 5/1984 | Penn et al. ........................ | 361/85 X |
| 4,703,387 | 10/1987 | Miller ................................ | 361/87 X |
| 4,777,437 | 10/1988 | Tasliro et al. .................... | 361/19 X |

FOREIGN PATENT DOCUMENTS 2224909 10/1974 France.

OTHER PUBLICATIONS

Patent Abstracts of Japan, vol. 9, No. 288 (E-358) [2011], Nov. 15, 1985, of Japanese Patent Application No. 60-130 107; "Superconductive Protecting Circuit", Toshiba K.K., Masami Urata.

Primary Examiner—Derek S. Jennings
Attorney, Agent, or Firm—Sughrue, Mion, Zinn, Macpeak & Seas

[57] ABSTRACT

A detection device for detecting transitions to the normal state in a superconducting winding, in particular in an electricity generator, and a protection device for protecting such a winding.

A detection device for detecting transitions in conductors from the superconducting state to the superconducting state in a superconducting winding at industrial frequency, in particular for the stator of an electricity generator (1). The device comprises an auxiliary generator (4) for generating a low current at a frequency which is considerably higher than industrial frequency, said current being single-phase or multi-phase depending on whether the main current through the winding is single-phase or multi-phase, said auxiliary generator being connected in parallel with the superconductor winding, the device further including means (5, 6) for detecting the change in phase difference between the auxiliary current and the auxiliary voltage which occurs when the conductors of said winding switch to the normal state.

5 Claims, 1 Drawing Sheet

DETECTION DEVICE FOR DETECTING TRANSITIONS TO THE NORMAL STATE IN A SUPERCONDUCTING WINDING, IN PARTICULAR FOR GENERATING ELECTRICITY, AND A PROTECTION DEVICE FOR PROTECTING SUCH A WINDING

FIELD OF THE INVENTION

The present invention relates to a detection device for detecting transitions in conductors from the superconducting state to the normal state in a superconducting winding at industrial frequency, in particular for the stator of an electricity generator.

BACKGROUND OF THE INVENTION

The invention also relates to a protection device for protecting such a winding and making use of such a detection device.

Given the extremely rapid nature of the switch-over from the superconducting state to the normal state when a fault appears, it is necessary to provide detection which is just as rapid in order to switch-off or limit the electrical current in order to avoid destroying the windings.

One means for detecting such transitions consists in observing the phase difference between current and voltage, which phase difference changes considerably when the winding conductors return to the normal state. However, such detection is relatively unreliable since the phase difference depends on the load on the generator.

The object of the present invention is to provide a detection device for detecting transitions in superconducting winding conductors which reacts immediately and reliably while still remaining simple, and which enables said windings to be effectively protected against destruction or damage.

SUMMARY OF THE INVENTION

The device of the present invention is characterized in that an auxiliary generator for generating a low current at a frequency which is considerably higher than industrial frequency, said current being single-phase or multi-phase depending on whether the main current through the winding is single-phase or multi-phase, said auxiliary generator being connected in parallel with the superconductor winding, the device further including means for detecting the change in phase difference between the auxiliary current and the auxiliary voltage which occurs when the conductors of said winding switch to the normal state.

The means for detecting variation in phase difference are preferably constituted by a decoupling capacitance in series with the auxiliary current generator, and having a value such that in conjunction with the inverse inductance of the generator, resonance is obtained at the frequency of the auxiliary current, together with means for detecting the appearance of a voltage across the terminals of the auxiliary current generator.

Advantageously, the device further includes a trap circuit at the frequency of the auxiliary current disposed between the auxiliary generator and the network powered by the main generator, thereby protecting the network from the disturbances that the measuring currents could give rise to.

A first protection device in accordance with the invention for protecting a superconducting winding at industrial frequency against excessive overheating due to the conductors of the winding switching over to the normal state comprises a switch controlled by a detection device as defined above together with a triac connected in series with an off-loading resistance connected in parallel with the winding to be protected, said triac being likewise controlled by the detection device.

Another protection device in accordance with the invention for protecting a superconducting winding at industrial frequencies comprises a switch controlled by the detection device together with a varistor connected in parallel with the winding to be protected.

A detection device for detecting transitions in the conductors of a superconducting winding of a synchronous machine, and protection devices controlled by such a detection device are described below by way of example and with reference to the figures of the accompanying drawing, in which:

DESCRIPTION OF THE PREFERRED EMBODIMENTS

Figure 1:
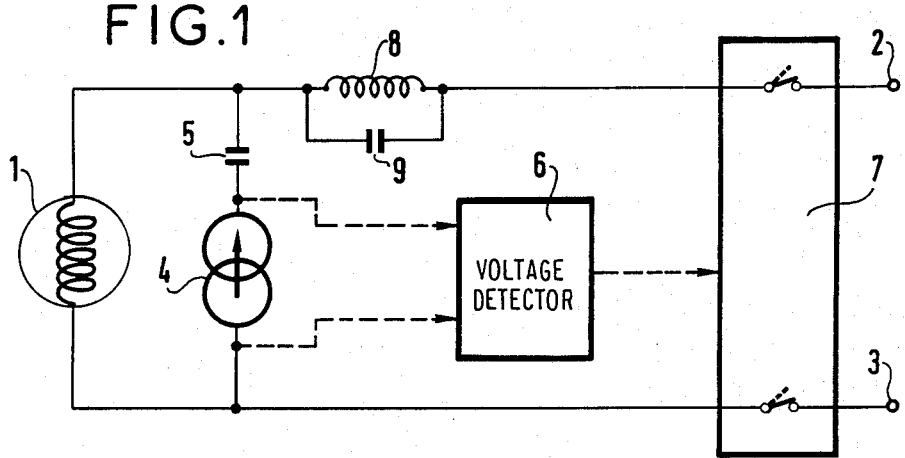
FIG. 1 is a schematic view which shows a detection device for detecting transitions in the stator of a synchronous machine having a superconducting winding.

FIG. 1 shows the detection principle. An auxiliary, low current generator 4 is superposed on a main generator 1 for generating three phase electricity at 50 Hz or 60 Hz. The current from the low current generator is not greater than about 1/100-th of the current from the main generator, and its frequency f1 is greater, for example 10 to 20 times greater than industrial frequency. The main superconducting winding generator feeds terminals 2 and 3 of a load via a circuit breaker 7. At this frequency, the generator 1 is represented solely by its inverse inductance Li without electromotive force (emf). Thus, the phase difference between current and voltage at this frequency does not depend on the load of the generator as is the case for the main system at 50 Hz or 60 Hz. It is determined solely by passive components having inductance Li and capacitance C.

Further, if a decoupling capacitor 5 in series with the auxiliary generator 4 is chosen to have a capacitane Cl in order to obtain resonance (i.e. such that $Li.Cl.(2\pi f1)^2 = 1$), a phase transition gives rise to a voltage across the terminals of the corresponding current source. This voltage is detected by a voltage detector 6 and is transmitted to the circuit breaker 7 which opens the circuit feeding the terminals 2 and 3 of the load network.

In order to protect the network from disturbances which could be generated by the measuring currents, a trap circuit for the frequency f1 in the form of an inductance 8 and a capacitance 9 is disposed between the main generator and the network.

If the inverse inductance of the main generator and the capacitance in series with the auxiliary generator are not at resonance, the transitions in the conductors of the winding are detected by detecting changes in the phase difference between the auxiliary current and the auxiliary voltage.

Protection, per se, of the A.C. superconducting winding cannot be provided by a conventional off-loading resistance because of the high losses that would occur in normal operation due to the voltage across the terminals of the winding.

Figure 2:
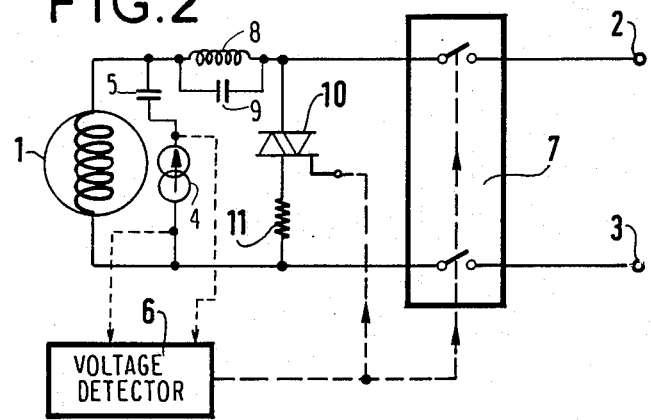
FIG. 2 is a schematic view which shows a protection device including a triac.

FIG. 2 shows a protection device in which the detection of the transition by voltage detector 6 triggers a triac 10 connected in parallel with the winding of the main generator, said triac being associated with an off-loading resistance 11. The triac may be triggered either prior to or simultaneously with the opening of the main circuit breaker 7.

Figure 3:
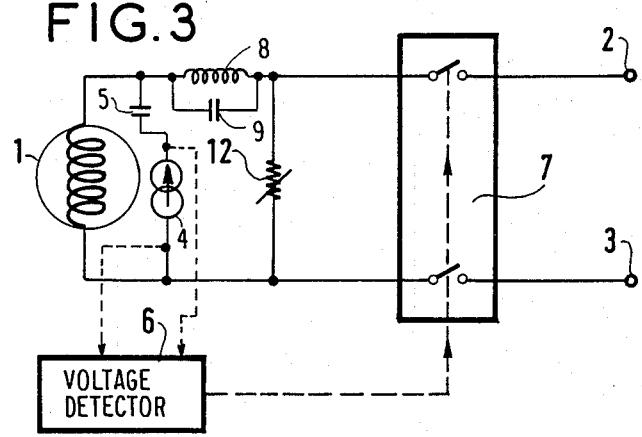
FIG. 3 is a schematic view which shows a protection device including a varistor.

Protection may also be provided for the superconducting winding as shown in FIG. 3, by means of a varistor 12 connected in parallel with the windings to be protected.

We claim:

1. A detection device for detecting transitions in conductors from the superconducting state to the normal state in a superconducting winding at industrial frequency connected across load terminals, in particular for the stator of an electricity generator (1), the device being characterized in that it comprises an auxiliary generator (4) for generating a low current at a frequency which is considerably higher than industrial frequency, said current being single-phase or multi-phase depending on whether the main current through the winding is single-phase or multi-phase, said auxiliary generator being connected in parallel with the superconductor winding, the detection device further including means (5, 6) for detecting the change in phase difference between the auxiliary current and the auxiliary voltage which occurs when the conductors of said winding switch to the normal state.

2. A detection device according to claim 1, characterized in that the means for detecting the change in phase difference are constituted by a decoupling capacitance (5) in series with the auxiliary current generator (4), and having a value such that in conjunction with the inverse inductance of the generator, resonance is obtained at the frequency of the auxiliary current, together with a voltage detector (6) for detecting the appearance of a voltage across the terminals of the auxiliary current generator.

3. A detection device according to claim 1, characterized in that it further includes a trap circuit (8, 9) for the auxiliary current frequency disposed between the auxiliary generator and the network fed by the main generator.

4. The detection device of claim 1 further comprising a protection device for protecting said superconducting winding at industrial frequency against excessive heating due to conductors of the winding switching to the normal state, said protection device comprising a switch (7) connected across said load terminals controlled by the detection device for detecting the conductors of the winding switching to the normal state, said protection device further including a triac connected in series with an off-loading resistance (11) and disposed in parallel with the superconducting winding to be protected and also connected to and controlled by the detection device (6).

5. The detection device of claim 1 further comprising a protection device for protecting said superconducting winding at industrial frequency against excessive heating resulting from the conductors of the superconductor winding switching to the normal state, the protective device comprising a switch (7) connected across the load terminals controlled by said detection device for detecting the conductor windings switching to the normal state, the protection device further including a varistor (12) in parallel with the superconductor winding to be protected.

* * * * *